United States Patent [19]

Sonoda

[11] Patent Number: 4,617,346

[45] Date of Patent: Oct. 14, 1986

[54] POLYPHENYLENE ETHER RESIN COMPOSITION

[75] Inventor: Nobuharu Sonoda, Osaka, Japan

[73] Assignee: Mitsubishi Gas Chemical Company, Inc., Tokyo, Japan

[21] Appl. No.: 818,073

[22] Filed: Jan. 13, 1986

Related U.S. Application Data

[63] Continuation-in-part of Ser. No. 694,367, Jan. 24, 1985, abandoned.

[30] Foreign Application Priority Data

Jan. 24, 1984 [JP] Japan .................. 59-10614

[51] Int. Cl.$^4$ ............................................. C08L 61/04
[52] U.S. Cl. ..................................... 525/68; 525/302; 525/305; 525/309; 525/902; 525/905
[58] Field of Search .................. 525/68, 902, 905, 302, 525/305, 309

[56] References Cited

U.S. PATENT DOCUMENTS 4,128,602 12/1978 Katchman ........................... 525/905
4,423,187 12/1983 Brandstetter et al. .............. 525/905

Primary Examiner—Jacob Ziegler
Attorney, Agent, or Firm—Sughrue, Mion, Zinn, Macpeak, and Seas

[57] ABSTRACT

A polyphenylene ether resin composition which possesses out standing impact resistance and weatherability and retains the advantageous properties inherent in a polyphenylene ether, which comprises:
(A) 10 to 90 parts by weight of polyphenylene ether resin which is selected from the group consisting of phenylene ether homopolymer and phenylene copolymer,
(B) 5 to 88 parts by weight of polystyrene resin which is selected from the group consisting of polystyrene rubber-modified polystyrene, styrene-butadiene copolymer, styrene/butadiene/acrylonitrile copolymer, styrene/α-methylstyrene copolymer, poly-α-methylstyrene, rubber-modified styrene/α-methylstyrene copolymer, and
(C) 1 to 25 parts by weight of an alkyl acrylate core shell graft copolymer which comprises a core and a shell further comprising an intermediate layer and an outermost layer,
  (1) 50 to 75% by weight of the core comprising a cross-linked elastic copolymer obtained by emulsion-polymerizing a monomer mixture containing 70 to 95% by weight of an alkyl acrylate having 2 to 12 carbon atoms in the alkyl group thereof and 30 to 5% by weight of butadiene in the presence of 0.01 to 3% by weight of a cross-linking agent based upon the amount of the monomer mixture,
  (2) 45 to 10% by weight of the intermediate layer copmrising a cross-linked polymer obtained by graft-polymerizing on the core (1) a monomer mixture containing 50 to 80% by weight of styrene and 50 to 20% by weight of methyl methacrylate in the presence of 0.01 to 2% by weight of a cross-linking agent based upon the amount of the monomer mixture, and
  (3) 5 to 25% by weight of the outermost layer comprising a cross-linked polymer obtained by graft-polymerizing on the intermediate layer (2) methyl methacrylate in the presence of 0.01 to 2% by weight of a crosslinking agent based upon the amount of methyl methacrylate, wherein the sum of the components (A), (B) and (C) is 100 parts by weight.

9 Claims, No Drawings

POLYPHENYLENE ETHER RESIN COMPOSITION

This is a continuation-in-part of application Ser. No. 694,367, filed Jan. 24, 1985, now abandoned.

FIELD OF THE INVENTION

This invention relates to a polyphenylene ether-type resin composition which excels in various mechanical properties, particularly impact resistance, and exhibits heat resistance and good moldability, and more particularly to a polyphenylene ether resin composition which comprises (A) a polyphenylene ether resin, (B) a polystyrene-type resin, and (C) a specific acrylate type core-shell graft copolymer.

BACKGROUND OF THE INVENTION

A polyphenylene ether resin, as is widely known, excels in heat resistance, mechanical properties, electrical properties, and so on and, therefore, is finding extensive utility as useful engineering plastics. Thus, the high heat resistance constitutes per se one of the salient features of a polyphenylene ether resin. This resin, nevertheless, has poor moldability because of a high melt viscosity and, further, tends to deteriorate at elevated temperatures possibly to the extent of even impairing its intrinsic properties. The adverse effects of these undesirable properties are conspicuous particularly on impact resistance.

To improve the impact resistance and the moldability of a polyphenylene ether resin, U.S. Pat. No. 3,383,435, for example, proposes incorporation of polystyrene in the polyphenylene ether resin and demonstrates that the impact resistance as well as the moldability is improved by the use of a rubber-modified polystyrene. Although the moldability is indeed improved in this resin composition, the impact resistance is not completely satisfactory from a practical point of view and the mold release property is not necessarily desirable. For improvement of impact resistance, several methods resorting to incorporation of a varying rubbery elastomer in the aforementioned composition (as in U.S. Pat. No. 3,660,581, U.S. Pat. No. 3,994,856, Japanese Patent Publication No. SHO 47(1972)-32781, Japanese Patent Publication No. SHO 57(1982)-56941, and Japanese Patent Application Laid-open No. SHO 53(1978)-72248) have been proposed. When the rubbery elastomer is added in a small amount, the effect of the addition is meager. When it is added in a large amount, the added elastomer impairs the melt flowing property of the composition and causes the appearance and mold release properties of the molded product of the composition to be degraded.

SUMMARY OF THE INVENTION

An object of this invention is to provide a novel polyphenylene ether resin composition.

Another object of this invention is to provide a polyphenylene ether resin composition which possesses outstanding impact resistance and weatherability.

A further object of this invention is to provide a polyphenylene ether resin composition which, as a consequence of incorporation of a rubbery elastomer, acquires advantageous moldability properties without any sacrifice in heat resistance, particularly heat distortion temperature (HDT).

The objects described above according to this invention are achieved by a polyphenylene ether resin composition which comprises:

(A) 10 to 90 parts by weight of polyphenylene ether resin which is selected from the group consisting of phenylene ether homopolymer and phenylene copolymer, (B) 5 to 88 parts by weight of polystyrene resin which is selected from the group consisting of polystyrene, rubber-modified polystyrene, styrene-butadiene copolymer, styrene/butadiene/acrylonitrile copolymer, styrene/α-methylstyrene copolymer, poly-α-methylstyrene, rubber-modified styrene/α-methylstyrene copolymer, and (C) 1 to 25 parts by weight of an alkyl acrylate core-shell graft copolymer which comprises a core and a shell further comprising an intermediate layer and an outermost layer, (1) 50 to 75% by weight of the core comprising a cross-linked elastic copolymer obtained by emulsion-polymerizing a monomer mixture containing 70 to 95% by weight of an alkyl acrylate having 2 to 12 carbon atoms in the alkyl group thereof and 30 to 5% by weight of butadiene in the presence of 0.01 to 3% by weight of a cross-linking agent based upon the amount of the monomer mixture, (2) 45 to 10% by weight of the intermediate layer comprising a cross-linked polymer obtained by graft-polymerizing on the core (1) a monomer mixture containing 50 to 80% by weight of styrene and 50 to 20% by weight of methyl methacrylate in the presence of 0.01 to 2% by weight of a cross-linking agent based upon the amount of the monomer mixture, and (3) 5 to 25% by weight of the outermost layer comprising a cross-linked polymer obtained by graft-polymerizing on the intermediate layer (2) methyl methacrylate in the presence of 0.01 to 2% by weight of a crosslinking agent based upon the amount of methyl methacrylate, wherein the sum of the components (A), (B) and (C) is 100 parts by weight.

The other objects and characteristic features of the present invention will become apparent to those skilled in the art as the disclosure is made in the following description of a preferred embodiment of the invention.

DETAILED DESCRIPTION OF THE INVENTION

The polyphenylene ether resin (A) as one of the components of the resin composition of this invention is (a) a polyphenylene ether obtained by oxidatively polycondensing a monocyclic phenol represented by the following formula (I)

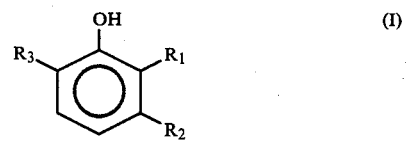

wherein $R_1$ represents a lower alkyl group of 1 to 3 carbon atoms and $R_2$ and $R_3$, which may be the same or different, each represent a hydrogen atom or a straight or branched chain alkyl group of 1 to 3 carbon atoms, or (b) a modified polyphenylene ether obtained by grafting an aromatic vinyl compound to a polyphenylene ether obtained as described above from a monocyclic phenol represented by the formula (I).

The polyphenylene ether may be a homopolymer or a copolymer involving two or more monocyclic phenols.

The homopolymer is obtained from units of a monocyclic phenol and the copolymer from units of a monocyclic phenol and at least one comonomer.

The alkyl group of 1 to 3 carbon atoms denoted by $R_1$ in the general formula can be methyl, ethyl, n-propyl, and isopropyl groups.

Specific examples of monocyclic phenols represented by the general formula (I) which are effective for use herein include 2,6-dimethylphenol, 2,6-diethylphenol, 2,6-dipropylphenol, 2-methyl-6-ethylphenol, 2-methyl-6-propylphenol, 2-ethyl-6-propylphenol, o-cresol, 2,3-dimethylphenol, 2,3-diethylphenol, 2,3-dipropylphenol, 2-methyl-3-ethylphenol, 2-methyl-3-propylphenol, 2-ethyl-3-methylphenol, 2-ethyl-3-propylphenol, 2-propyl-3-methylphenol, 2-propyl-3-ethylphenol, 2,3,6-trimethylphenol, 2,6-dimethyl-3-ethylphenol, and 2,6-dimethyl-3-propylphenol.

Specific examples of polyphenylene ethers obtained by polycondensing the monocyclic phenols (I) enumerated above include homopolymers such as poly-(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, and poly(2-ethyl-6-propyl-1,4-phenylene)ether, and copolymers such as 2,6-dimethylphenol-2,3,6-trimethylphenol copolymer, 2,6-dimethylphenol-2,3,6-triethylphenol copolymer, 2,6-diethylphenol-2,3,6-trimethylphenol copolymer and 2,6-dipropylphenol-2,3,6-trimethylphenol copolymer.

Of the polyphenylene ethers cited above, poly(2,6-dimethyl-1,4-phenylene)ether and 2,6-dimethylphenol-2,3,6-trimethylphenol copolymer prove particularly advantageous and are preferred.

The homopolymers and copolymers mentioned above can be produced by methods well known to the art such as, for example, as disclosed in U.S. Pat. Nos. 3,306,875, 4,011,200 and 4,067,851.

The aforementioned modified polyphenylene ether (I) to be used as the polyphenylene ether resin (A), i.e., one of the components of the resin composition of this invention, is a graft polymer obtained by grafting an aromatic vinyl compound represented by the following formula (II) to the polyphenylene ether in the form of a homopolymer or a copolymer.

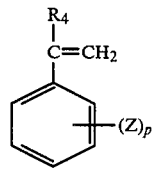

(II)

wherein $R_4$ represents a hydrogen atom or a methyl group, Z represents a chlorine atom or a methyl group, and p is 0 or an integer of 1 to 3.

This graft polymer can be produced, for example, by the method disclosed in Japanese Patent Application Laid-open No. SHO 50(1975)-126800. Examples of the aromatic vinyl compounds which can be effectively used herein include styrene, alpha-methylstyrene, vinyl toluene, vinyl xylene, ethylstyrene, n-propylstyrene, isopropylstyrene, chlorostyrene, and bromostyrene.

Of all the possible graft polymers produced from monomers represented by the general formula (II), a graft polymer of poly(2,6-dimethyl-1,4-phenylene)ether with styrene and a graft polymer of 2,6-dimethylphenol-2,3,6-trimethylphenol copolymer with styrene prove particularly advantageous and are preferred.

The polystyrene-type resin (B), one of the components of the resin composition of the present invention, is a resin containing at least about 25% by weight of repeating units of the following general formula (III).

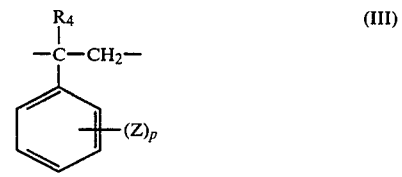

wherein $R_4$, Z and p have the same meanings as defined in the general formula (II).

The repeating unit of the general formula (III) is derived from a styrene monomer of the aforementioned general formula (II).

Examples of the polystyrene-type resin which can be used effectively herein include polystyrene, high-impact polystyrene (rubber-modified polystyrene), styrene-butadiene copolymer, styrene-butadieneacrylonitrile copolymer, styrene-alpha-methylstyrene copolymer, poly-α-methylstyrene, rubber-modified styrene/α-methylstyrene copolymer, styrene-p-methylstyrene copolymer, styrene-methylstyrene copolymer, poly-p-methylstyrene, high impact poly-p-methylstyrene and p-methylstyrene-maleic anhydride copolymer.

In these polystyrene-type resins, high impact polystyrene proves particularly advantageous. Polystyrene type resins modified with various rubber components such as polybutadiene, rubbery butadienestyrene copolymer, and EPDM are also usable.

The acrylate type core-shell graft copolymer (C), one of the components of the resin composition of this invention, is a core-shell graft copolymer which comprises a core of a cross-linked copolymer obtained by copolymerizing an alkyl acrylate having 2 to 12 carbon atoms in the alkyl group thereof and a polyfunctional polymerizable monomer possessing a conjugated diene type double bond represented by butadiene as essential components in the presence of a small amount of a cross-linking agent added thereto and a shell comprising an intermediate layer and an outermost layer formed in two steps on the core. The intermediate layer is formed of cross-linked polymer obtained by graft-polymerizing a monomer mixture of styrene or styrene and acrylonitrile as a major component and a methyl methacrylate, and the outermost layer is formed of a cross-linked polymer obtained by graft-polymerizing methyl methacrylate onto the intermediate layer. In the core-shell graft copolymer, the core of cross-linked copolymer and the shell of the hard resin are formed in relative amounts such that the core accounts for 50 to 75% by weight, intermediate layer for 45 to 10% by weight and outmost layer for 5 to 25% by weight, respectively, of the core-shell graft copolymer.

Of all the possible alkyl acrylates having 2 to 12 carbon atoms in the alkyl group thereof and used for the formation of the core of cross-linked elastic copolymer, n-butyl acrylate and 2-ethylhexyl acrylate prove particularly advantageous and are preferred.

As examples of the conjugated diene, 1-methyl-2-vinyl-4,6-heptadien-1-ol, 7-methyl-3-methylene-1,6-octadiene, and 1,3,7-octatriene may be cited in addition to butadiene described above.

The cross-linking agent used in the formation of the core and the shell mentioned above must be selected such that it is satisfactorily copolymerizable with the alkylacrylate and polyfunctional polymerizable monomers described above during the course of polymerization. Examples of cross-linking agents which can be advantageous herein include aromatic polyfunctional vinyl compounds represented by divinyl benzene and divinyl toluene, dimethacrylates such as ethylene glycol dimethacrylate, diethylene glycol dimethacrylate, triethylene glycol dimethacrylate, and diacrylates such as ethylene glycol diacrylate, diethylene glycol diacrylate, triethylene glycol diacrylate, and 1,3-butane diol diacrylate.

Optionally in the copolymerization of the alkyl acrylate and the polyfunctional polymerizable monomer possessing a conjugated diene type double bond, a monofunctional polymerizable monomer appropriately selected from the group consisting of aromatic vinyl compounds represented by styrene, methacrylates represented by methyl methacrylate, vinyl nitrile compounds represented by acrylonitrile, vinyl ether compounds represented by methyl vinyl ether, halogenated vinyl compounds represented by vinyl chloride, and vinyl ester compounds represented by vinyl acetate, particularly selected from the group consisting of methacrylates represented by methyl methacrylate, can be used as part of the alkyl acrylate having 2 to 12 carbon atoms in the alkyl group thereof.

As examples of the vinyl compound to be used for the graft copolymerization on the core of cross-linked elastic copolymer, methacrylates represented by methyl methacrylate, aromatic vinyl compounds represented by styrene, vinyl nitrile compounds represented by acrylonitrile, and halogenated vinyl compounds represented by vinyl chloride are exemplary. These polymerizable monomers may be used either alone or in the form of a mixture of two or more thereof. During the course of the graft polymerization, this vinyl compound may be used in combination with the above-described cross-linking agent.

Typical methods available for the production of the acrylate type core-shell graft copolymer are: A method which comprises preparing coagulated particles having an average particle diameter 0.12 to 0.3 μm, by adding a coagulating agent such as, for example, a mineral acid like hydrochloric acid or sulfuric acid to a latex which has an average particle diameter, preferably 0.05 to 0.1 μm and contains 50 to 75% by weight of a cross-linked elastic copolymer obtained by emulsion polymerization of a mixed monomer of 70 to 95% by weight of an alkyl acrylate having 2 to 12 carbon atoms in the alkyl group thereof, 30 to 5% by weight of butadiene, and 0.01 to 3% by weight, preferably 0.05 to 1.5% by weight of a cross-linking agent, separating 50 to 25 parts by weight of a monomer component containing 0.01 to 2.0 parts by weight of a cross-linking agent, causing 45 to 10% by weight of a monomer mixture of 50 to 80% by weight of styrene, 50 to 20% by weight of methyl methacrylate and 0.01 to 2% by weight of a cross-linking agent copolymerizable therewith to be addition polymerized with the coagulated particles to form an addition polymer (i.e., an intermediate layer), and subsequently causing 5 to 25% by weight of a monomer of methyl methacrylate and 0.01 to 2% by weight of a cross-linking agent to be addition polymerized with the addition polymer to form an outermost layer.

Another method which comprises preparing coagulated particles 0.12 to 0.5 μm in average particles diameter by adding a coagulating agent to a latex containing 50 to 75% by weight of a cross-linked elastic copolymer obtained by emulsion polymerizing a mixture of monomers comprising 70 to 95% by weight of an alkyl acrylate having 2 to 12 carbon atoms in the alkyl group thereof and 30 to 5% by weight of butadiene in the presence of 0.01 to 3% by weight, preferably 0.05 to 1.5% by weight, of a cross-linking agent added thereto, causing 45 to 10% by weight of a mixture of monomers comprising 10 to 50% by weight of acrylonitrile, 10 to 80% by weight of styrene, 10 to 50% by weight of methyl methacrylate and 0.01 to 2% by weight of a cross-linking agent copolymerizable therewith to be addition polymerized with the coagulated particles to form an addition polymer (i.e., an intermediate layer), and subsequently causing 5 to 25% by weight of methyl methacrylate and containing 0.01 to 2% by weight of cross-linking agent to be addition polymerized with the addition polymer to form an outermost layer.

The graft polymerization may be carried out in one step or it may be performed in a plurality of steps by dividing the component monomers for the graft copolymerization into as many portions of varying compositions. The preferred methods for the production of the core-shell graft copolymer have been demonstrated as being performed in the form of emulsion polymerization. This does not mean that emulsion polymerization is the only manner of polymerization available, however. Of course, the acrylate type graft copolymer contemplated by this invention can be produced by any methods of polymerization known to the art. As commercially available examples of the acrylate type core-shell graft copolymer, the resins marketed under trademark designations "HIA-15," "HIA-28," and "HIA-30" by Kureha Kagaku Kogyo K.K. can be advantageously utilized.

In the polyphenylene ether type resin composition of the present invention, the polyphenylene ether resin (A) accounts for 10 to 90 parts by weight, preferably 20 to 80 parts by weight, the styrene-type resin (B) for 5 to 88 parts by weight, preferably 15 to 75 parts by weight, and the acrylate-type core-shell graft copolymer for 1 to 25 parts by weight, preferably 5 to 25 parts by weight.

If the proportion of the polyphenylene ether resin is less than 10 parts by weight, the properties inherent in the polyphenylene ether resin are not fully exhibited. If the proportion exceeds 90 parts by weight, the improvement in moldability is not sufficient. If the proportion of the styrene-type resin exceeds 88 parts by weight, the properties due to the use of the polyphenylene ether are not fully exhibited. If the proportion of styrene-type resin is less than 5 parts by weight, the improvement in moldability is not sufficient. If the proportion of the acrylate type core-shell graft copolymer is less than 1 part by weight, the improvement with respect to the jetting at the gate portion is obtained with difficulty and the improvement in impact resistance is not sufficient.

The preparation of the polyphenylene ether type resin composition of the present invention can be effected by adopting any methods known to the art. For example, it may be accomplished by mixing the components with a suitable mixing device such as a V blender or a Henshell mixer and subsequently kneading the resultant mixture in an extruder, a Banbury mixer, or a roll.

Optionally, the polyphenylene ether type resin composition of this invention contains various additives known to the art. Examples of the additives which can be advantageously used include flame retardants represented by organic phosphates and halogenated organic compounds, flame-retarding aids represented by antimony oxide and other antimony compounds, stabilizers, ultraviolent light absorbents, pigments, dyes, lubricants, and fillers and reinforcing agents such as inorganic and organic powders and fibers. The polyphenylene ether type resin composition may further contain, if desired, other elastomer or other resin components within an amount not harmful to the properties of the product of this invention. Examples of elastomers which can be advantageously used for this purpose include A-B-A' type elastomeric block copolymers (wherein A and A' each represent a block resulting from polymerization of an aromatic vinyl compound and B represents a block resulting from polymerization of a conjugated diene), AB'-A' type elastomeric block copolymers (wherein A and A' are the same as above and B' represents a block resulting from hydrogenation of the aforementioned block B), polybutadiene, polyisoprene, an elastomeric copolymer of a diene compound and an aromatic vinyl compound, a nitrile rubber, an elastomeric ethylene-propylene copolymer, an ethylene-propylene-diene copolymer (EPDM), thiokol rubbers, polysulfide rubbers, acrylic rubbers, a grafted product of butyl rubber and polyethylene, polyurethane rubbers, and polyester elastomers. For example, the polycarbonate oligomer from bisphenol A of tetrabromobisphenol A may be employed to improve moldability, flame retardancy, and surface properties, thermoplastic aromatic polyester resins such as polyethylene terephthalate and polybutylene terephthalate and polyolefins such as polyethylene and ethylene-propylene copolymer to improve chemical resistance and heat-resistant polyesters such as polyester carbonate and polyallylate (such as those marketed by Unitika under trademark designation of U polymers) to improve heat resistance.

The present invention is described more specifically below by reference to nonlimiting working examples and comparative experiments. Wherever "percent" and "molecular weight" are mentioned, they are based on respective amounts by weight unless otherwise specified.

EXAMPLES 1-8 and COMPARATIVE EXAMPLES 1-4

Compositions using a polyphenylene ether resin comprising a copolymer of 2,6-dimethyl phenol and 2,3,6-trimethyl phenol, polystyrene-type resin (HI-polystyrene produced by Asahi-Dow and marketed under the trademark designation of "Styron 492"), and acrylate type graft copolymers (produced by Kureha Kagaku Kogyo K.K. and marketed under the trademark designations of "HIA-15 and HIA-28", simply indicated as "HIA-15" and "HIA-28" in the following table) (Examples 1-4) and compositions using the components just mentioned plus various polyolefins, i.e. ethylenepropylene copolymer (produced by Japan Synthetic Rubber Co., Ltd. and marketed under the trademark designation of "JSR EP 07C", simply indicated as (a) in the following table), an olefinic elastomer (produced by Mitsui Petrochemical Co., Ltd. and marketed under the trademark designation of "Milastomer 9590B", simply indicated as (b) in the following table), or an ethylene-ethyl acrylate copolymer (produced by Japan Unicar Co., Ltd. and marketed under the trademark designation of "NUC Copolymer DPDJ-6169", simply indicated as (c) in the following table) (Examples 5-8) were mixed in a blender in the proportions indicated in Table 1 below.

The resultant mixtures were each supplied to a biaxial extruder, melted and kneaded at a cylinder temperature of 280° C. and converted into pellets. The pellets were dried at 100° C. for at least 2 hours in a hot-air drier and injection molded at 280° C. to produce test pieces for determination of physical properties. The results obtained are shown in Table 1 below.

For comparison, the procedures of the foregoing examples were followed by using a composition comprising a polyphenylene ether resin and a polystyrene-type resin (Comparative Example 1), a composition comprising the composition of Example 1 but without the acrylate type graft copolymer (Comparative Example 2), a composition comprising the composition of Example 2 but without the acrylate type graft copolymer (Comparative Example 3), and a composition comprising the composition of Example 3 but without the acrylate type graft copolymer (Comparative Example 4). The results obtained are shown in Table 1 below.

In Table 1, the data given under the heading "MFR (*1)" and he heading "jetting (*2)" were determined as follows:

*1: The procedure defined by ASTM D1238 under the conditions of a load of 3.8 kg and a temperature of 250° C.

*2: A given sample of predried pellets was treated with a Sumitomo-Nestar injection molding machine (Neomat N350/120) to produce a test piece measuring 89.5 mm × 49.5 mm × 3.2 mm and having a gate cross section of a thickness of 3 mm and a width of 7 mm under the conditions of a cylinder temperature of 280° C., a mold temperature of 80° C., an injection pressure of 1100 kg/cm², FCV 7/12, an injection time of 14 seconds, and a cooling time of 25 seconds. The test piece was visually inspected with respect to the condition of jetting in the gate portion.

TABLE 1

| | Example (E) and Comparative Example (C) No. | | | | | | | | | | | |
|---|---|---|---|---|---|---|---|---|---|---|---|---|
| | E-1 | E-2 | E-3 | E-4 | E-5 | E-6 | E-7 | E-8 | C-1 | C-2 | C-3 | C-4 |
| Resin Composition (%) | | | | | | | | | | | | |
| Polyphenylene ether resin | 40 | 40 | 39 | 41 | 40 | 40 | 40 | 40 | 40 | 40 | 40 | 40 |
| Polystryrene-type resin | 55 | 45 | 51 | 44 | 40 | 43 | 44 | 44 | 60 | 50 | 50 | 50 |
| [HIA-15] | 5 | 15 | 10 | | 12 | 10 | 10 | | | | | |

TABLE 1-continued

| | Example (E) and Comparative Example (C) No. | | | | | | | | | | | |
|---|---|---|---|---|---|---|---|---|---|---|---|---|
| | E-1 | E-2 | E-3 | E-4 | E-5 | E-6 | E-7 | E-8 | C-1 | C-2 | C-3 | C-4 |
| [HIA-28] | | | | 15 | | | | 10 | | | | |
| Polyolefin | | | | | | | | | | | | |
| (a) | | | | | 8 | | | 6 | 10 | | | |
| (b) | | | | | | 7 | | | | 10 | | |
| (c) | | | | | | | 6 | | | | 10 | 10 |
| Physical Property | | | | | | | | | | | | |
| MFR* 1 g/10 min. | 0.72 | 0.66 | 0.73 | 0.65 | 0.78 | 0.76 | 0.77 | 0.67 | 0.46 | 0.82 | 0.83 | 0.81 |
| HDT 18.6 kg/cm², °C. | 120 | 123 | 121 | 122 | 120 | 120 | 119 | 121 | 123 | 120 | 119 | 120 |
| Izod impact, notch, | | | | | | | | | | | | |
| kg · m/cm 1/8" | 16.4 | 21.6 | 19.6 | 23.1 | 22.5 | 21.7 | 23.1 | 20.6 | 6 | 17.2 | 18.6 | 16.9 |
| 1/4" | | 12.3 | 11.8 | 12.0 | | | | | - | | | |
| Tensile strength, kg/cm² | 519 | 508 | 509 | 506 | 518 | 509 | 515 | 502 | 521 | 502 | 511 | 509 |
| Tensile elongation, % | 53 | 57 | 52 | 51 | 52 | 56 | 57 | 52 | 49 | 52 | 47 | 48 |
| flexural strength, kg/cm² | 721 | 709 | 712 | 710 | 715 | 712 | 705 | 726 | 724 | 702 | 706 | 708 |
| Modulus in flexure, kg/cm² × 10³ | 21.2 | 20.2 | 20.8 | 20.2 | 21.2 | 21.2 | 20.2 | 21.4 | 21.4 | 20.8 | 20.8 | 20.8 |
| Rockwell hardness, R scale | 116 | 112 | 117 | 109 | 109 | 113 | 112 | 112 | 119 | 112 | 114 | 116 |
| Jetting *2 | — | — | — | — | None | None | None | None | — | Heavy | Heavy | Heavy |

*MFR = Melt Flow Rate

EXAMPLE 9 and COMPARATIVE EXAMPLES 5 and 6

Test pieces obtained under the conditions of Examples 1–4 were tested for Izod impact strength at low temperatures. The results obtained are shown in Table 2 below.

For comparison, a composition comprising the composition of Examples 1–4 except that MBS resin (a styrene-butadiene, methyl methylacrylate graft copolymer (elastomer: butadiene type latex) produced by Japan Synthetic Rubber Co., Ltd. and marketed under the trademark designation of "JSR MBS 67") was used instead of "HIA-15" (Comparative Example 5) and a composition comprising the composition of Examples 1–4 except that MAS resin (a styrene-alkyl acrylate-methyl methylacrylate graft copolymer (elastomer: alkyl acrylate type latex) produced by Mitsubishi Rayon Co., Ltd. and marketed under the trademark designation "Metablen W529" was used instead of "HIA-15" (Comparative Example 6) were treated and tested under the conditions of Examples 1–4. The results obtained are also shown in Table 2.

TABLE 2

| | | Example 9 | Comparative Example 5 | Comparative Example 6 |
|---|---|---|---|---|
| Resin composition (%) | Polyphenylene ether resin | 40 | 40 | 40 |
| | Polystyrene-type resin | 45 | 45 | 45 |
| | HIA-15 | 15 | | |
| | MBS resin | | 15 | |
| | MAS resin | | | 15 |
| 1/8" Izod Impact strength (notch), kg, cm/cm | 23° C. | 21.6 | 21.2 | 20.9 |
| | 0 | 20.5 | 18.6 | 13.7 |
| | −10 | 18.1 | 8.5 | 10.2 |

EXAMPLE 10 and COMPARATIVE EXAMPLE 7

Test pieces obtained under the same conditions as those of Examples 1–4 were treated for prescribed lengths of time with a sunshine weather meter, and then tested for tensile strength and retention of tensile elongation. The results obtained are shown in Table 3 below.

For comparison, a composition comprising the composition of Examples 1–4 except that MBS resin (produced by Japan Synthetic Rubber Co., Ltd. and marketed under the trademark designation of "JSR MBS 67") was used instead of "HIA-15" (Comparative Example 4) was tested under the same conditions as those of Examples 1–4. The results obtained are shown in Table 3 below.

TABLE 3

| | | Example 10 | Comparative Example 7 |
|---|---|---|---|
| Resin composition (%) | Polyphenylene ether resin | 43 | 43 |
| | Polystyrene-type resin | 47 | 47 |
| | HIA-15 | 10 | |
| | MBS resin | | 10 |
| Weatherability[1]* | Ratio of Retention (%) | | |
| | Tensile strength 500 hrs | 107 | 98 |
| | 1000 hrs | 101 | 92 |
| | Elongation 200 hrs | 61 | 42 |
| | 500 hrs | 52 | 31 |

(Note): [1]*The data given here represent the results determined after treatment for specified lengths of time with the sunshine weather meter.

While the invention has been described in detail and with reference to specific embodiments thereof, it will be apparent that various changes and modifications can be made therein without departing from the spirit and scope thereof.

What is claimed:

1. A polyphenylene ether resin composition comprising:
   (A) 10 to 90 parts by weight of polyphenylene ether resin which is selected from the group consisting of phenylene ether homopolymer and phenylene ether copolymer,
   (b) 5 to 88 parts by weight of polystyrene resin which is selected from the group consisting of polystyrene, rubber-modified polystyrene, styrene-butadiene copolymer, styrene/butadiene/acrylonitrile copolymer, styrene/α-methylstyrene copolymer, poly-α-methylstyrene, and rubber-modified styrene/α-methylstryene copolymer, and (C) 1 to 25 parts by weight of an alkyl acrylate core-shell graft copolymer which comprises a core and a shell further comprising an intermediate layer and an outermost layer,
  (1) 50 to 75% by weight of said core comprising a cross-linked elastic copolymer obtained by emulsion-polymerizing a monomer mixture containing 70 to 95% by weight of an alkyl acrylate having 2 to 12 carbon atoms in the alkyl group thereof and 30 to 5% by weight of butadiene in the presence of 0.01 to 3% by weight of a cross-linking agent based upon the amount of the monomer mixture,
  (2) 45 to 10% by weight of said intermediate layer comprising a cross-linked polymer obtained by graft-polymerizing on the core (1) a monomer mixture containing 50 to 80% by weight of styrene and 50 to 20% by weight of methyl methacrylate in the presence of 0.01 to 2% by weight of a cross-linking agent based upon the amount of the monomer mixture, and
  (3) 5 to 25% by weight of said outermost layer cormprising a cross-linked polymer obtained by graft-polymerizing on the intermediate layer (2) methyl methacrylate in the presence of 0.01 to 2% by weight of a crosslinking agent based upon the amount of methyl methacrylate, wherein the sum of the components (A), (B) and (C) is 100 parts by weight.

2. A resin composition according to claim 1, wherein the amount of said polyphenylene ether resin (A) is 20 to 80 parts by weight.

3. A resin composition according to claim 1, wherein said polyphenylene ether resin (A) is poly-(2,6-dimethyl-1,4-phenylene) ether.

4. A resin composition according to claim 1, wherein said polyphenylene ether resin (A) is 2,6-dimethylphenol-2,3,6-trimethylphenol copolymer.

5. A resin composition according to claim 1, wherein the amount of said polystyrene resin (B) is 15 to 75 parts by weight.

6. A resin composition according to claim 1, wherein said polystyrene resin (B) is rubber-modified polystyrene.

7. A resin composition according to claim 1, wherein said core (1) of said core-shell graft copolymer (C) has an average particle diameter of 0.12 to 0.3 μm.

8. A resin composition according to claim 1, wherein the amount of said alkyl acrylate core-shell graft copolymer (C) is 5 to 25 parts by weight.

9. A polyphenylene ether resin composition comprising:

(A) 10 to 90 parts by weight of polyphenylene ether resin which is selected from the group consisting of phenylene ether homopolymer and phenylene ether copolymer, (B) 5 to 88 parts by weight of polystrene resin which is selected from the group consisting of polystyrene, rubber-modified polystyrene, styrene-butadiene copolymer, styrene/butadiene/acrylonitrile copolymer, styrene/α-methylstyrene copolymer, poly-α-methylstyrene, and rubber-modified styrene/α-methylstyrene copolymer, and (C) 1 to 25 parts by weight of an alkyl acrylate core-shell graft copolymer which comprises a core and a shell further comprising an intermediate layer and an outermost layer,
  (1) 50 to 75% by weight of said core comprising a cross-linked elastic copolymer obtained by emulsion-polymerizing a monomer mixture containing 70 to 95% by weight of an alkyl acrylate having 2 to 12 carbon atoms in the alkyl group thereof and 30 to 5% by weight of butadiene in the presence of 0.01 to 3% by weight of a cross-linking agent based upon the amount of the monomer mixture,
  (2) 45 to 10% by weight of said intermediate layer comprising a cross-linked polymer obtained by graft-polymerizing on the core (1) a monomer mixture containing 10 to 50% by weight of acrylonitrile, 10 to 80% by weight of styrene and 10 to 50% by weight of methyl methacrylate in the presence of 0.01 to 2% by weight of a cross-linking agent based upon the amount of the monomer mixture, and
  (3) 5 to 25% by weight of said outermost layer comprising a cross-linked polymer obtained by graft-polymerizing on the intermediate layer (2) methyl methacrylate in the presence of 0.01 to 2% by weight of a crosslinking agent based upon the amount of methyl methacrylate, wherein the sum of the components (A), (B) and (C) is 100 parts by weight.

* * * * *